United States Patent
Meng et al.

(10) Patent No.: US 11,458,340 B2
(45) Date of Patent: Oct. 4, 2022

(54) LOCOMOTIVE-MOUNTED POWER BATTERY PACK FIRE SAFETY CONTROL SYSTEM AND METHOD

(71) Applicant: CRRC ZIYANG CO., LTD., Sichuan (CN)

(72) Inventors: YuFa Meng, Sichuan (CN); DingKang Ye, Sichuan (CN); PingHua Wang, Sichuan (CN)

(73) Assignee: CRRC ZIYANG CO., LTD., Sichuan (CN)

( * ) Notice: Subject to any disclaimer, the term of this patent is extended or adjusted under 35 U.S.C. 154(b) by 373 days.

(21) Appl. No.: 16/612,654

(22) PCT Filed: Nov. 1, 2018

(86) PCT No.: PCT/CN2018/113254
§ 371 (c)(1),
(2) Date: Nov. 11, 2019

(87) PCT Pub. No.: WO2020/056864
PCT Pub. Date: Mar. 26, 2020

(65) Prior Publication Data
US 2020/0368565 A1    Nov. 26, 2020

(30) Foreign Application Priority Data

Sep. 21, 2018   (CN) .......................... 201811105970.2

(51) Int. Cl.
*B61L 15/00*     (2006.01)
*A62C 3/16*      (2006.01)

(52) U.S. Cl.
CPC .............. *A62C 3/16* (2013.01); *B61L 15/009* (2013.01); *B60L 2200/26* (2013.01)

(58) Field of Classification Search
CPC ...... A62C 3/16; B61L 15/009; B60L 2200/26
See application file for complete search history.

(56) References Cited

U.S. PATENT DOCUMENTS

2002/0127467 A1    9/2002   Watanabe et al.
2017/0253258 A1*   9/2017   Bramucci .......... B61L 27/0005

FOREIGN PATENT DOCUMENTS

CN    107845742 A    3/2018
CN    108091947 A    5/2018
(Continued)

*Primary Examiner* — Robert J McGarry, Jr.
(74) *Attorney, Agent, or Firm* — Novick, Kim & Lee, PLLC; Allen Xue

(57) ABSTRACT

A locomotive-mounted power battery pack fire safety control system includes a power battery pack, a power battery management system main controller, a rolling stock microcomputer system and a rolling stock display screen. The power battery pack is an enclosed installation isolated from external air. An inert gas injection pipe, a smoke detector and a temperature detector are arranged at the top end inside the power battery pack. An inert gas storage device is arranged outside the power battery pack. The inert gas storage device is connected with the inert gas injection pipe. A pressure detector and an inert gas injection control switch are arranged in turn on a pipeline through which the inert gas storage device discharges an inert gas to the power battery pack. The pressure detector and the inert gas injection control switch are connected with the rolling stock microcomputer system.

8 Claims, 1 Drawing Sheet

(56) References Cited

FOREIGN PATENT DOCUMENTS

CN           109045514 A  * 12/2018  ............... A62C 3/07
WO   WO-2008073353 A2 *  6/2008  .......... B60L 15/2045

* cited by examiner

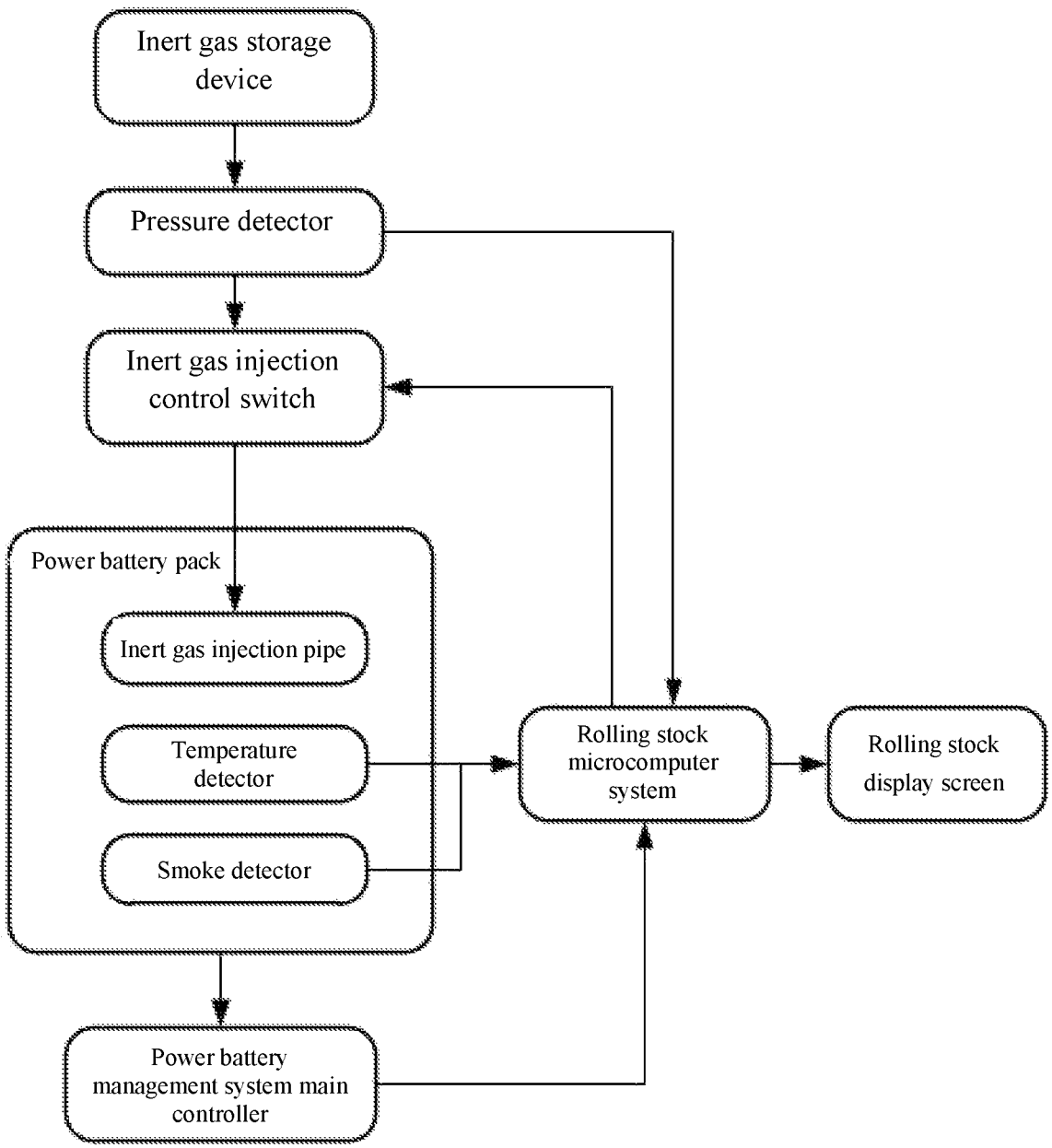

LOCOMOTIVE-MOUNTED POWER BATTERY PACK FIRE SAFETY CONTROL SYSTEM AND METHOD

FIELD OF THE INVENTION

The present invention belongs to the field of rail transit, in particular relates to a locomotive-mounted power battery pack fire safety control system and method.

DESCRIPTION OF THE RELATED ART

At present, locomotive-mounted power battery pack fire safety control systems for domestic and foreign hybrid locomotives or motor train unit lack open flames detection and control systems, and power battery management systems are used to control temperature of the power battery packs within the safe working temperature. However, if short circuit occurs to the inside or load of the power battery pack, or the power battery suffers from thermal failure, combustion even explosion may occur to the power battery pack.

SUMMARY OF THE INVENTION

In order to solve the above problem, the present invention provides a locomotive-mounted power battery pack fire safety control system, and the system comprises a power battery pack, a power battery control system main controller, a rolling stock microcomputer system and a rolling stock display screen connected in turn respectively, in particular:

the power battery pack is a closed installation isolated from external air, an inert gas injection pipe, a smoke detector and a temperature detector are arranged at the top end inside the power battery pack, and the smoke detector and the temperature detector are connected with the rolling stock microcomputer system;

an inert gas storage device is arranged outside the power battery pack, the inert gas storage device is connected with the inert gas injection pipe, and an inert gas is stored in the inert gas storage device;

a pressure detector and an inert gas injection control switch are arranged in turn on a pipeline through which the inert gas storage device discharges an inert gas to the power battery pack, and the pressure detector and the inert gas injection control switch are connected with the rolling stock microcomputer system.

Further, the inert gas injection control switch is an electropneumatic valve.

Further, the inert gas is nitrogen or carbon dioxide.

Further, the smoke detector is a smoke sensor, the temperature detector is a temperature sensor, and the pressure detector is a pressure sensor.

The method comprises the following steps:

an alarm signal is transmitted to the rolling stock microcomputer system via the power battery management system main controller when a power battery management system subcontroller arranged in the power battery pack detects that internal temperature of the power battery pack is higher than a set-point, or an alarm signal is directly transmitted to the rolling stock microcomputer system when the temperature detector inside the power battery pack detects that the internal temperature of the power battery pack is higher than the set-point or the smoke detector detects smoke. The inert gas injection control switch is controlled to open after the rolling stock microcomputer system receives the alarm signal to inject the inert gas to the power battery pack and extinguish flame of the power battery pack, and the rolling stock microcomputer system transmits the abnormal temperature or ignition information of the power battery pack to the rolling stock display screen for display and record. In addition, the pressure detector transmits pressure of the inert gas storage device to the rolling stock microcomputer system at any time, the rolling stock microcomputer system transmits inert gas addition information to the rolling stock display screen when the pressure of the inert gas storage device is lower than a preset value, and the inert gas addition information is displayed on the rolling stock display screen.

The present invention has the following beneficial effects:
(1) The present invention can completely ensure safe and reliable operation of the power battery pack with low additional equipment cost;
(2) If the power battery pack catches fires due to various reasons, the system can effectively control spread of the fire to provide value time for crew and passengers to escape and firefighters for extinguish fire, which can greatly reduce property loss.

BRIEF DESCRIPTION OF THE DRAWING

FIG. 1 is a schematic diagram of a locomotive-mounted power battery pack fire safety control system.

DESCRIPTION OF THE PREFERRED EMBODIMENTS

The embodiments of the invention will be described in combination with accompanied drawing for clear understanding of the technical features, purpose and advantages of the invention.

The invention provides a locomotive-mounted power battery pack fire safety control system. As shown in FIG. 1, the system comprises a power battery pack, a power battery control system main controller, a rolling stock microcomputer system and a rolling stock display screen connected in turn respectively, in particular:

The power battery pack is a closed installation isolated from external air, an inert gas injection pipe, a smoke detector and a temperature detector are arranged at the top end inside the power battery pack, and the smoke detector and the temperature detector are connected with the rolling stock microcomputer system.

An inert gas storage device is arranged outside the power battery pack, the inert gas storage device is connected with the inert gas injection pipe, and nitrogen is stored in the inert gas storage device.

A pressure detector and an inert gas injection control switch are arranged in turn on a pipeline through which the inert gas storage device discharges nitrogen to the power battery pack, and the pressure detector and the inert gas injection control switch are connected with the rolling stock microcomputer system.

The system works as follows:

An alarm signal is transmitted to the rolling stock microcomputer system via the power battery management system main controller when a power battery management system subcontroller arranged in the power battery pack detects that internal temperature of the power battery pack is higher than a set-point, or an alarm signal is directly transmitted to the rolling stock microcomputer system when the temperature detector inside the power battery pack detects that the internal temperature of the power battery pack is higher than the set-point or the smoke detector detects smoke. The inert gas injection control switch is controlled to open after the rolling stock microcomputer system receives the alarm signal to inject the nitrogen to the power battery pack and extinguish flame of the power battery pack, and the rolling stock microcomputer system transmits the abnormal temperature or ignition information of the power battery pack to the rolling stock display screen for display and record. In addition, the pressure detector transmits pressure of the inert gas storage device to the rolling stock microcomputer system at any time, the rolling stock microcomputer system transmits nitrogen addition information to the rolling stock display screen when the pressure of the inert gas storage device is lower than a preset value, and the inert gas addition information is displayed on the rolling stock display screen.

The embodiment is only preferred embodiment of the invention. It should be understood that the invention is not limited to the form disclosed herein, and the embodiment shall not be considered to exclude other embodiments, and can be used in various combination, modification and environment, and can be modified through the above teaching or the technology or knowledge in the art within the scope of the idea describe herein. All modifications and changes made by those skilled in the art without departing from the spirit and scope of the invention can be incorporated in the protection scope of the appended claims of the invention.

For description of the invention, it should be stated that orientation or position relations indicated by the terms "center", "above", "under", "left", "right", "inside" and "outside" are based on the orientation or position relations shown in the accompanied drawing or the commonly arranged orientation or position relations as used in the invention, and they are used to describe the invention and simplify description herein indicating or implying that the device or component indicated must have specific orientation and be constructed and operated in specific orientation. Therefore, the embodiment described herein shall not be considered to limit the invention.

For description of the invention, it should be stated that the term "connection" should be understood in a board sense unless otherwise clearly specified and defined. For example, it may be a fixed connection, a detachable connection or an integrated connection; and it can be a mechanical connection or an electrical connection.

The invention claimed is:

1. A locomotive-mounted power battery pack fire safety control system, comprising a power battery pack, a power battery control system main controller, a rolling stock microcomputer system, and an inert gas storage device, wherein:
the power battery pack is sealed from external air, and has in inlet of an inert gas injection pipe, a smoke detector, and a temperature detector are arranged inside the power battery pack, and the smoke detector and the temperature detector are connected with the rolling stock microcomputer system,
the inert gas storage device is arranged outside the power battery pack is connected to the power battery pack through the inert gas injection pipe, and contains an inert gas; and
a pressure detector and an inert gas injection control switch are arranged on the inert gas injection pipe, and the pressure detector and the inert gas injection control switch are connected with and controlled by the rolling stock microcomputer system.

2. The locomotive-mounted power battery pack fire safety control system of claim 1, wherein the inert gas injection control switch is an electropneumatic valve.

3. The locomotive-mounted power battery pack fire safety control system of claim 1, wherein the inert gas is nitrogen or carbon dioxide.

4. The locomotive-mounted power battery pack fire safety control system of claim 1, wherein the smoke detector is a smoke sensor, the temperature detector is a temperature sensor, and the pressure detector is a pressure sensor.

5. A safety control method for operating a locomotive mounted power battery pack fire safety control system, which comprises a power battery pack, a power battery control system main controller, a rolling stock microcomputer system, and an inert gas storage device, comprising:
monitoring an interior of the power battery pack using a temperature detector and a smoke detector installed in an interior of the power battery pack, wherein the power battery pack is sealed from external air;
transmitting an alarm signal to the rolling stock microcomputer system when the temperature detector detects an internal temperature of the power battery pack is higher than a set-point or the smoke detector detects smoke;
opening the inert gas injection control switch installed on an inert gas injection pipe to inject the inert gas to the power battery pack, wherein the inert gas injection pipe connects the inert gas storage device and the interior of the power batter pack; and
monitoring, by a pressure detector installed on the inert gas injection pipe, a pressure of the inert gas storage device.

6. The method of claim 5, wherein the alarm signal is transmitted to the rolling stock microcomputer system through the power battery management main controller.

7. The method of claim 5, wherein the rolling stock microcomputer system controls the opening of the inert gas injection control switch.

8. The method of claim 5, further comprising displaying the temperature of the power battery pack and the pressure of the inert gas storage device on a rolling stock display connected to the rolling stock microcomputer system.

* * * * *